Sept. 9, 1947.   R. O. BRADLEY ET AL   2,427,190
ROTARY HOPPER FOR PACKAGING SCALES
Filed March 6, 1945
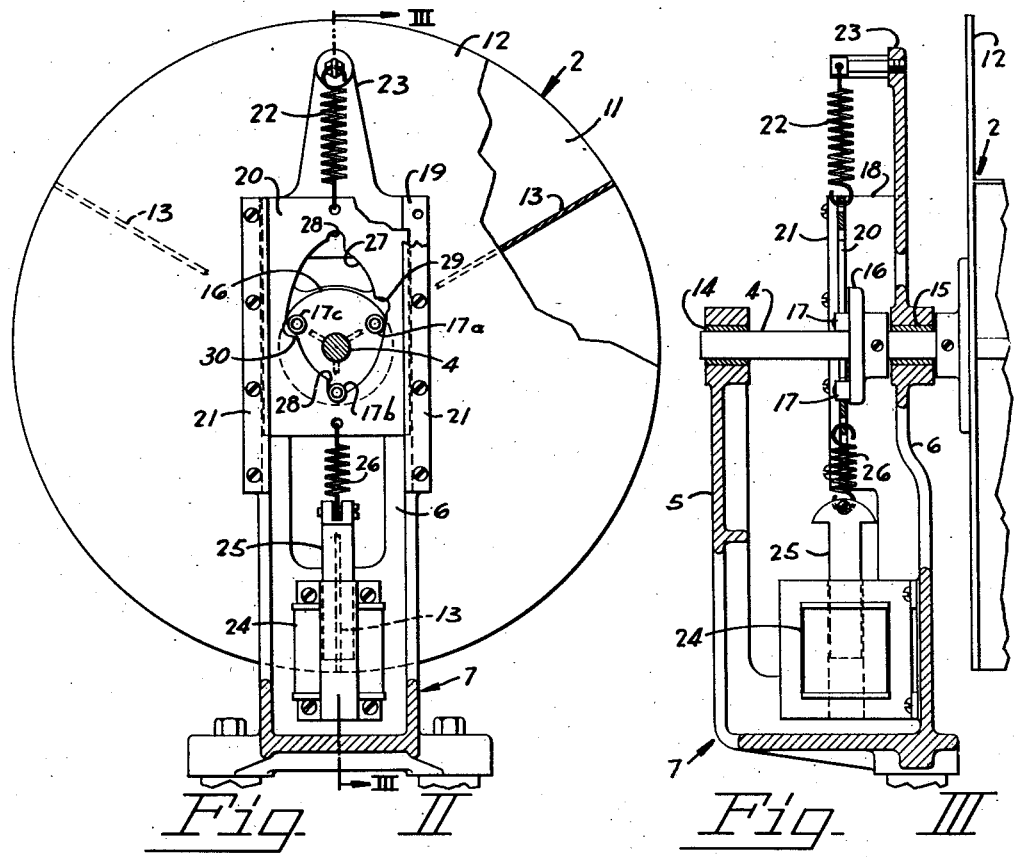
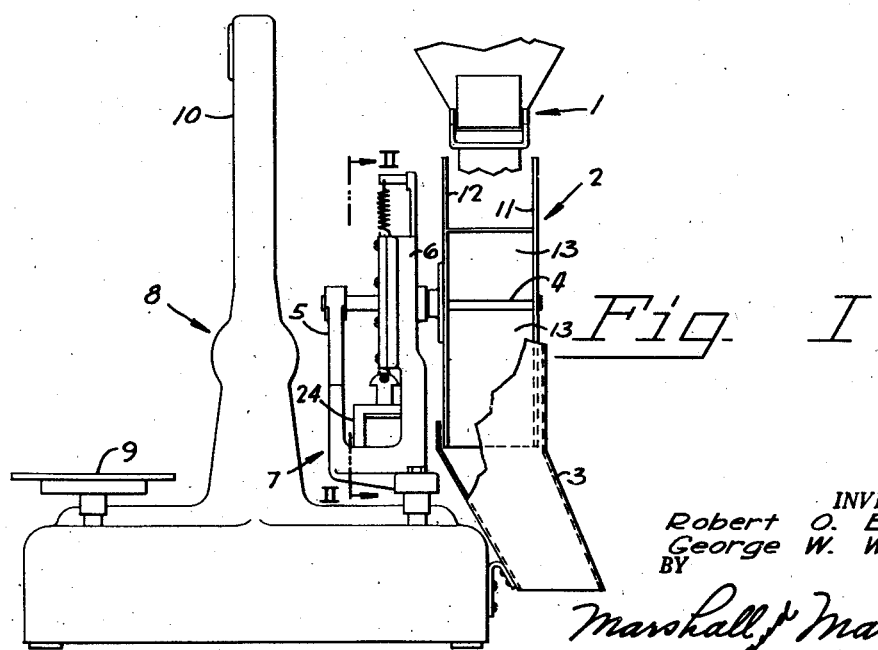
INVENTORS
Robert O. Bradley
George W. Walther
BY
Marshall & Marshall
ATTORNEYS Patented Sept. 9, 1947

2,427,190

UNITED STATES PATENT OFFICE 2,427,190

ROTARY HOPPER FOR PACKAGING SCALES

Robert O. Bradley and George W. Walther, Toledo, Ohio, assignors to Toledo Scale Company, Toledo, Ohio, a corporation of New Jersey Application March 6, 1945, Serial No. 581,248

6 Claims. (Cl. 198—211)

This invention relates to packaging scales and in particular to means for indexing a multi-compartment rotary hopper.

Rotary hoppers have been used in weighing scales because of the ease and speed with which their contents may be discharged and the hopper conditioned to receive the next load. As ordinarily used, the compartments of a rotary hopper are not symmetric with respect to the axis of rotation in order that the weight of the accumulated load in a hopper compartment will provide the driving force to rotate the hopper to the next position. In such a hopper the only external power required for operation is that power which unlocks a latch and after the hopper has started to rotate returns the latch into position to stop the hopper in position to receive the next load.

When small quantities of light, bulky material are being weighed there is insufficient force to provide reliable operation of a rotary hopper.

The object of this invention is to provide a simple inexpensive mechanism for a small capacity rotary hopper which will provide positive indexing of the hopper in response to signals received from the weighing mechanism supporting the hopper.

Another object is to provide a simple mechanism for converting reciprocating motion into intermittent unidirectional rotary motion.

These and other objects and advantages are attained in the structure shown in the drawings which illustrate an example of the invention.

According to the invention an improved reciprocating cam plate cooperates with three pins set in a circle on the face of a disk secured to the shaft which carries a three compartment hopper. The improved cam plate is arranged to reciprocate along a line perpendicular to the hopper shaft. It has an opening whose periphery is formed as a cam surface adapted to cooperate with the three pins secured to the disk on the hopper shaft so as to provide a positive drive and positive locking of the rotary hopper. The cam surfaces are particularly characterized by having a notch at each end of the opening in line with the direction of movement of the plate which notches are adapted to engage the pins to provide positive locking of the hopper even though the mechanism is operated at high speed. The cam surface is designed so as to divorce the driving and locking functions and thus provide a drive which is substantially irreversible when the cam plate is at the ends of its stroke and the hopper is in its indexed or load receiving position.

These features of the invention are illustrated in the accompanying drawings illustrating a preferred form of low capacity rotary hopper incorporating the invention.

In the drawings:

Figure I is a front elevation showing a rotary hopper installed on a low capacity weighing scale.

Figure II is a side elevation of the improved form of rotary hopper operating mechanism as seen from the line II—II of Figure I.

Figure III is a vertical elevation through the rotary hopper operating mechanism taken along the line III—III of Figure II.

These specific figures and the accompanying description are intended to merely illustrate a preferred form of the invention and not to impose limitations upon the claims.

Material to be packaged or weighed into individual batches is fed from a vibratory feeder 1 into a rotary hopper 2 where it accumulates until a desired weight is reached and then by a third of a revolution of the hopper 2 the accumulated material is discharged through a chute 3. The hopper 2 is carried on a shaft 4 which is journaled in the ends of arms 5 and 6 of an upstanding U-shaped frame 7. The U-shaped frame 7 is carried on a weighing scale 8 in place of the usual load receiving platter. The weighing scale 8 is of a type commonly known as an even balance scale and in common with that type of scale includes a counterweight receiving platter 9 and an indicator housing 10. Major increments of weight are counterbalanced by weights placed on the weight receiving platter 9 while minor increments are indicated by an indicator cooperating with a chart mounted within the indicator housing 10.

The hopper 2 is formed of a pair of parallelly mounted, circular side walls 11 and 12 which are connected by partitions 13 to form three sector-shaped material receiving compartments. Wear of the hopper supporting shaft 4 is minimized by antifriction bushings 14 and 15 installed in the arms 5 and 6 respectively of the U-shaped frame 7. In the space between the bushings 14 and 15 the shaft 4 is provided with a disk 16. The disk 16 has three pins 17 extending from its face so as to lie parallel to the shaft 4. The pins 17 are equally spaced about a circle which is concentric with the shaft 4.

Wings 18 extending from the sides of the end 6 of the U-shaped bracket 7 on either side of the shaft 4 furnish ways 19 for guiding a cam plate 20. The cam plate 20 is held against the ways 19 by guide strips 21 screwed to the surface of the ways 19. The cam plate 20 is urged to its upper limit of travel by a helical tension spring 22 suspended from an overhead arm 23 erected from the arm 6 of the U-shaped bracket 7. Movement of the cam plate 20 in a downward direction is produced by energizing a solenoid 24, mounted in the bottom of the U-shaped frame 7, whose armature 25 is connected to the cam plate 20 by a relatively stiff tension spring 26.

The cam plate 20 has a generally elliptical opening 27 through which the hopper shaft 4 and the pins 17 of the disk 16 extend. The opening 27 in the cam plate 20 has U-shaped locking notches 28 at the ends of its major axis which lies parallel to the direction of movement of the cam plate 20. The notches 28 serve, by engaging one or another of the pins 17, to lock the hopper in position when the cam plate 20 is at the ends of its stroke. The sides of the notches are steep enough so that it is impossible for the hopper to drive the cam plate and thus possibly get out of step. The periphery of the elliptical opening 27 near the ends of its minor axis is provided with driving faces 29 and 30. The faces 29 and 30 are displaced from the minor axis a sufficient distance so that the plate may move and unlock a pin from one of the notches 28 before the driving face 29 or 30 engages the next pin.

When it is desired to dump the load accumulated in the hopper, the hopper being in the position shown in Figure II, the solenoid 24 is energized so that it immediately attracts its armature 25 thus extending the connecting spring 26. The tension in the spring 26 overcomes the upward pull of the suspending spring 22 so that the cam plate 20 moves downward until the driving face 29 engages the pin 17a on the disk 16. The inertia of the hopper 2 prevents instantaneous rotation so that the cam plate 20 is momentarily arrested and the tension spring 26 is fully extended. The downward force on the pin 17a causes the hopper to rotate clockwise as seen in Figure II until the pin 17c engages the side of the upper locking notch 28. The inertia of the hopper tends to cause it to bounce back when the pin 17c strikes the side of the notch 28 but such motion is prevented because the opposite side of the notch 28 has by that time caught the trailing side of the pin 17c so that it is securely in place and further rotation of the hopper is prevented. As soon as the cam plate reaches the bottom of the stroke, i. e., when the pin 17c is locked in the upper U-shaped notch 28, it actuates a switch, not shown, which is incorporated in the electrical control of the solenoid 24 so as to de-energize the solenoid. The suspending spring 22 then raises the cam plate 20 thereby disengaging the upper locking notch 28 from the pin 17c and allowing the driving face 30 to engage the pin 17b which at this time occupies a position sixty degrees clockwise from the position shown in Figure II. The continued upward movement of the cam plate 20 returns it to the position shown in Figure II except that now the pin 17a is locked in the lower U-shaped notch 28 instead of the pin 17b and the hopper has been indexed one third of a revolution.

The novel form of cam plate provides in a simple structure positive indexing of a rotary hopper as well as providing positive locking and elimination of bounce when the hopper has reached the end of each increment of rotation. The mechanism is adapted for rapid operation in that the speed is limited only by the inertia of the hopper. Thus, with a minimum of equipment the advantage of speed and simplicity of a rotary hopper are retained and its field of usefulness is extended to cover the reliable weighing of small amounts of material.

Having described the invention, we claim:

1. A device for converting reciprocating motion into intermittent unidirectional rotary motion, comprising a disk on the shaft to be rotated, three pins extending from a face of the disk, said pins being equally spaced around a circle concentric with the shaft, and a cam plate mounted to reciprocate along a line perpendicular to the shaft, said plate having an opening whose periphery forms a cam surface to cooperate with said pins, the periphery of the opening being formed of various sized generally elliptical arcs whose long axes lie parallel to the direction of movement of the plate, and characterized by having a U-shaped notch at each end of the long axis of the opening.

2. A device for converting reciprocating motion into intermittent unidirectional rotary motion, comprising a disk on the shaft to be rotated, three pins extending from a face of the disk, said pins being equally spaced around a circle concentric with the shaft, a cam plate mounted to reciprocate along a line perpendicular to the shaft, said cam plate having a generally elliptical opening whose periphery is formed into cam surfaces to cooperate with said pins, said cam surface being characterized by a shallow U-shaped notch at each end of its major axis and pin engaging steps near each end of its minor axis, and resilient means connecting said cam plate to a source of reciprocating power.

3. In a device of the class described, in combination, a three compartment rotary hopper, a disk mounted on a shaft carrying the hopper, three pins extending from a face of said disk, said pins being equally spaced arond a circle concentric with the shaft, a cam plate mounted for reciprocating in a plane perpendicular to the shaft, said plate having a generally elliptical opening whose major axis is parallel to the direction of reciprocation of said plate and whose periphery is formed to provide driving faces near the ends of the minor axis and locking notches at the ends of the major axis, said cam plate engaging said pins to provide positive movement and locking of said hopper for each reciprocation of said cam plate.

4. In a device for converting reciprocatory motion into intermittent unidirectional rotary motion, in combination, a member to be rotated, a series of three pins that project from the member in a direction parallel to the axis of the member, a cam plate mounted to reciprocate along a straight path perpendicular to the axis of the member, said cam plate having an opening whose periphery forms a cam surface acting against the pins, the opening being generally elliptical in outline with a U-shaped notch at each end of its major and minor axes and having alternate quarters of its periphery lying generally along an ellipse passing through the bottoms of U-shaped notches at the ends of the minor axis, and means for reciprocating the cam plate.

5. In a device for converting reciprocatory motion into unidirectional rotary motion, in combination, a disk on a shaft to be rotated, three pins extending from the face of the disk parallel to the axis of the shaft, a cam plate mounted for reciprocatory movement along a line perpendicular to the shaft, said plate having an opening therein to encircle the pins, the periphery of the opening being formed to provide a pair of U-shaped locking notches at the ends of the major axis of the opening and a pair of oppositely directed driving surfaces one adjacent each end of the minor axis of the opening with the notches and driving surfaces joined by generally elliptical arcs, and means for reciprocating the plate.

6. In a device of the class described, in combination, a three compartment rotary hopper, a shaft for supporting the hopper, a member on the shaft that has three equally spaced projections, a cam plate mounted for reciprocation along a line perpendicular to the shaft, the cam plate having a generally elliptical opening whose periphery forms a cam surface for engaging the projections of the member, the periphery having a pair of U-shaped notches at the ends of the major axis of the opening and a pair of oppositely directed driving surfaces adjacent the ends of the minor axis of the opening, and means for reciprocating the cam plate.

ROBERT O. BRADLEY.
GEORGE W. WALTHER.

REFERENCES CITED

The following references are of record in the file of this patent:

UNITED STATES PATENTS

| Number | Name | Date |
| --- | --- | --- |
| 388,390 | Barton | Aug. 28, 1888 |
| 480,972 | Sellers | Aug. 16, 1892 |
| 586,614 | McCollough | July 20, 1897 |
| 610,129 | Ericson | Aug. 30, 1898 |
| 618,129 | Outcalt | Jan. 24, 1899 |
| 941,003 | Anderson | Nov. 23, 1909 |
| 1,369,445 | Kruse | Feb. 22, 1921 |
| 1,724,889 | Tomlinson | Aug. 13, 1929 |